United States Patent
Graves et al.

(10) Patent No.: US 9,840,619 B2
(45) Date of Patent: Dec. 12, 2017

(54) STYRENE/BUTADIENE DIBLOCK COPOLYMER-CONTAINING BLENDS THAT ARE NOT AN AGGLOMERATION AND A PROCESS FOR PREPARATION

(71) Applicant: FIRESTONE POLYMERS, LLC, Akron, OH (US)

(72) Inventors: Daniel F. Graves, Canal Fulton, OH (US); Peter W. Boerner, Massillon, OH (US); John R. Schreffler, Clinton, OH (US); Christine M. Rademacher, Akron, OH (US)

(73) Assignee: Firestone Polymers, LLC, Akron, OH (US)

( * ) Notice: Subject to any disclaimer, the term of this patent is extended or adjusted under 35 U.S.C. 154(b) by 0 days.

(21) Appl. No.: 14/686,123

(22) Filed: Apr. 14, 2015

(65) Prior Publication Data

US 2015/0218363 A1 Aug. 6, 2015

Related U.S. Application Data

(63) Continuation of application No. 13/057,678, filed as application No. PCT/US2009/052787 on Aug. 5, 2009, now abandoned.

(60) Provisional application No. 61/086,234, filed on Aug. 5, 2008.

(51) Int. Cl.
*C08L 53/02* (2006.01)
*C08F 297/04* (2006.01)
*C08J 3/00* (2006.01)

(52) U.S. Cl.
CPC ............ *C08L 53/02* (2013.01); *C08F 297/04* (2013.01); *C08F 297/044* (2013.01); *C08J 3/005* (2013.01); *C08J 2325/10* (2013.01); *C08J 2353/02* (2013.01); *C08L 2205/02* (2013.01); *C08L 2205/025* (2013.01)

(58) Field of Classification Search
CPC ..... C08F 297/04; C08F 297/044; C08J 3/005; C08J 2325/20; C08J 2325/02; C08L 53/02; C08L 2205/025; C08L 2666/02; C08L 2666/24
See application file for complete search history.

(56) References Cited

U.S. PATENT DOCUMENTS

| | | | | |
|---|---|---|---|---|
| 4,087,484 A | * | 5/1978 | Miki | C08L 53/02 523/328 |
| 4,161,472 A | * | 7/1979 | Lehr | C08L 27/06 523/200 |
| 4,381,357 A | * | 4/1983 | von der Wettern | E01C 19/104 524/68 |
| 4,892,903 A | | 1/1990 | Himes | |
| 5,342,685 A | | 8/1994 | Gobran | |
| 5,453,319 A | | 9/1995 | Gobran | |
| 5,660,498 A | * | 8/1997 | Freeman | E01C 11/005 404/17 |
| 6,417,270 B1 | * | 7/2002 | Wollum | C08F 297/04 525/271 |
| 6,451,964 B1 | | 9/2002 | Hakamaya et al. | |
| 2003/0176574 A1 | * | 9/2003 | St. Clair | C08F 287/00 525/88 |
| 2004/0151901 A1 | | 8/2004 | Pearson et al. | |
| 2005/0182194 A1 | | 8/2005 | He | |
| 2006/0155062 A1 | * | 7/2006 | De Keyzer | A61L 15/58 525/88 |
| 2006/0160955 A1 | | 7/2006 | Boerner et al. | |
| 2006/0229411 A1 | | 10/2006 | Hatfield | |
| 2007/0112102 A1 | * | 5/2007 | Kluttz | C08L 95/00 524/59 |
| 2009/0171024 A1 | | 7/2009 | Jakubowski et al. | |
| 2009/0182074 A1 | * | 7/2009 | Scholten | C08L 95/00 524/68 |

FOREIGN PATENT DOCUMENTS

| | | |
|---|---|---|
| DE | 203 10 484 U1 | 11/2003 |
| DE | 103 30 820 A1 | 2/2005 |
| EP | 2 062 939 A1 | 5/2009 |
| KR | 10-0655635 | 12/2006 |
| WO | WO 9323488 A1 | 11/1993 |
| WO | WO 2006076340 A1 | 7/2006 |

OTHER PUBLICATIONS

McKay et al; The Influence of Styrene-Butadiene Diblock Copolymer on Styrene-Butadiene-Styrene Triblock Copolymer Viscoelastic Properties and Product Performance; Journal of Applied Polymer Science, vol. 56, 947-958 (1995).

* cited by examiner

*Primary Examiner* — Jeffrey Mullis
(74) *Attorney, Agent, or Firm* — Meredith E. Hooker; Arthur M. Reginelli

(57) ABSTRACT

A process for producing a styrene-butadiene diblock copolymer-containing blend that is not an agglomeration, that involves mixing a styrene-butadiene multiblock thermoplastic elastomer solution with a styrene-butadiene diblock copolymer solution. Blends comprising a styrene-butadiene diblock copolymer and a styrene-butadiene multiblock thermoplastic elastomer, which blends are not an agglomeration.

10 Claims, No Drawings

STYRENE/BUTADIENE DIBLOCK COPOLYMER-CONTAINING BLENDS THAT ARE NOT AN AGGLOMERATION AND A PROCESS FOR PREPARATION

This application is a Continuation Application of U.S. Non-Provisional application Ser. No. 13/057,678, filed on Sep. 4, 2011, which is the national stage of International Application No. PCT/US09/52787, filed Aug. 5, 2009, which claims the benefit of U.S. Application No. 61/086,234, filed Aug. 5, 2008, all incorporated herein by reference.

FIELD OF THE DISCLOSURE

The present disclosure relates to specific styrene-butadiene diblock copolymer-containing blends or compositions that are not an agglomeration, and a process for preparing the blends or compositions.

BACKGROUND OF THE DISCLOSURE

It has been found that solution polymerized styrene-butadiene diblock copolymers are useful in adhesives and asphalt modification. The copolymers are produced in the form of bales having optimum friability and grindability. However, the copolymers generally must be ground into granular form, and have an antiblock applied before use in adhesive and asphalts. Accordingly, it would be advantageous to provide a styrene/butadiene diblock copolymer-containing blend that is not an agglomeration, and a process that would avoid or reduce the need for having to grind the product and having an antiblock applied before use, in adhesives and asphalts.

SUMMARY OF THE DISCLOSURE

The present disclosure, in one embodiment, relates to a specific blends or compositions comprising a styrene-butadiene diblock copolymer and a styrene-butadiene multiblock thermoplastic elastomer. The blends or compositions are not an agglomeration. The blends or compositions have a number average molecular weight ($M_n$) of about 40,000 to about 250,000 g/mole in one embodiment, and in another embodiment, of about 45,000 to about 100,000 g/mole, and in yet another embodiment, of about 60,000 to about 80,000 g/mole.

The present disclosure, in another embodiment, relates to a process for producing specific styrene-butadiene diblock copolymer-containing blends that are not an agglomeration. The process involves blending a solution of styrene-butadiene diblock copolymer with a solution of a styrene-butadiene multiblock thermoplastic elastomer, and drying the blends.

Furthermore, in one embodiment, with respect to the blends or compositions herein, it is required that the bound styrene content of the styrene-butadiene diblock copolymer differ from the bound styrene content of the styrene-butadiene multiblock thermoplastic elastomer.

In another embodiment, the blends or compositions comprise a styrene-butadiene multiblock thermoplastic elastomer that has a number average molecular weight ($M_n$) ranging from about 0.5 to about 2 times the number average molecular weight ($M_n$) of the styrene-butadiene diblock copolymer.

In another embodiment, the blend or composition comprises a styrene-butadiene multiblock thermoplastic elastomer that both has a bound styrene content which differs from the bound styrene content of the styrene-butadiene diblock copolymer, and has a number average molecular weight ranging from about 0.5 to about 2 times the number average molecular weight of the styrene-butadiene diblock copolymer.

Furthermore, it is required that the blends or compositions herein, not have been produced either in situ in a process or by a coupling type reaction.

DETAILED DESCRIPTION OF THE DISCLOSURE

The present disclosure, in one embodiment, relates to a specific blends or compositions comprising a styrene-butadiene diblock copolymer and a styrene-butadiene multiblock thermoplastic elastomer. The blends or compositions are not an agglomeration. In one embodiment, the blends or compositions comprising a styrene-butadiene diblock copolymer and a styrene-butadiene multiblock thermoplastic elastomer comprise at least 95% styrene-butadiene copolymer, and in another embodiment, comprise at least 95% to 100% styrene-butadiene copolymer.

The present disclosure, in another embodiment, relates to a process for producing specific styrene-butadiene diblock copolymer-containing blends that are not an agglomeration. The process involves blending a solution of styrene-butadiene diblock copolymer with a solution of a styrene-butadiene multiblock thermoplastic elastomer, and drying the blends. The diblock copolymer may have a number average molecular ($M_n$) of about 40,000 to about 250,000, and in another embodiment, of about 45,000 to about 100,000, and in another embodiment, of about 60,000 to about 80,000 g/mole. The multiblock thermoplastic elastomer may have a number average molecular weight ($M_n$) of about 40,000 to about 250,000 g/mole in one embodiment, and in another embodiment of about 45,000 to about 100,000 g/mole, and in another embodiment, from about 60,000 to about 80,000 g/mole.

Furthermore, in one embodiment, with respect to the blends or compositions, and the process herein, it is required that the bound styrene content of the styrene-butadiene diblock copolymer differ from the bound styrene content of the styrene-butadiene multiblock thermoplastic elastomer. In one embodiment, the bound styrene content of the diblock copolymer differs from the bound styrene content of the multiblock thermoplastic elastomer by any amount. In another embodiment, the difference in bound styrene contents is greater than about 2%, and in another embodiment, the difference is greater than about 10%, and in yet another embodiment, the difference is greater than about 20%. In one embodiment, the bound styrene content of the styrene-butadiene diblock copolymer is less than 50%, and the bound styrene content of the styrene-butadiene multiblock thermoplastic elastomer is also less than 50%.

In another embodiment, the blends or compositions, and the process, comprise a styrene-butadiene multiblock thermoplastic elastomer that has a number average molecular weight ($M_n$) ranging from about 0.5 to about 2 times the number average molecular weight ($M_n$) of the styrene-butadiene diblock copolymer.

In another embodiment, the blend or composition and the process, comprises a styrene-butadiene multiblock thermoplastic elastomer that both has a bound styrene content which differs from the bound styrene content of the styrene-butadiene diblock copolymer, and has a number average molecular weight ranging from about 0.5 to about 2 times the number average molecular weight of the styrene-butadiene diblock copolymer.

Furthermore, it is required that the blends or compositions herein, not have been produced either in situ in a process or by a coupling type reaction.

In more detail, the styrene-butadiene diblock copolymer of the blend or composition or used in the process, is characterized by having a bound styrene content, in one embodiment, of about 5% to about 60% based on the copolymer, and has a block styrene content in one embodiment, of about 5% to about 60%, based on the copolymer, and in another embodiment, from about 10% to about 45%; and has a number average molecular weight ($M_n$) in one embodiment, of about 40,000 g/mole to about 250,000 g/mole, and in another embodiment, of about 45,000 g/mole to about 100,000 g/mole and in yet another embodiment, of about 60,000 to about 80,000 g/mole. An example of the styrene-butadiene diblock copolymer of the present blend or composition is Stereon 210 copolymer (Stereon is a registered trademark of Firestone Polymers, Akron, Ohio).

The styrene-butadiene multiblock thermoplastic elastomer utilized in the present blend or composition, and used in the process, is characterized by having a bound styrene content, in one embodiment, of about 20% to about 60%, based on the elastomer; and has a block styrene content of about 20% to about 60%, based on the elastomer, and has a structural aspect of $(SB)_x$, $(SBS)_x$ or $(BSB)_x$ where the subscript "x," refers to the number of units. The styrene-butadiene elastomers have a number average molecular weight ($M_n$) in one embodiment, of about 40,000 to about 250,000 g/mole, and in another embodiment, of about 45,000 to about 100,000 g/mole, and in another embodiment, of about 60,000 to about 80,000 g/mole. An example of the styrene-butadiene elastomer of the present blend or composition is Stereon 842A elastomer (Stereon is a registered trademark of Firestone Polymers of Akron, Ohio).

In another embodiment, the blend or composition comprises, and the process utilizes, a styrene-butadiene diblock copolymer that has a bound styrene content of about 5% to about 60% based on the copolymer, and a block styrene content of about 5% to about 60% based on the copolymer, and a number average molecular weight ($M_n$) in one embodiment, of about 40,000 to about 250,000 g/mole, and in another embodiment, of about 45,000 to about 100,000 g/mole, and in another embodiment, of about 60,000 to about 80,000 g/mole, and a styrene-butadiene multiblock thermoplastic elastomer that has a bound styrene content of about 20% to about 60% based on the elastomer, a block styrene content of about 20% to about 60% based on the elastomer, and a number average molecular weight ($M_n$) in one embodiment, of about 40,000 to about 250,000 g/mole, and in another embodiment, of about 45,000 to about 100,000 g/mole, and in yet another embodiment of about 60,000 to about 80,000 g/mole.

In another embodiment, the blends or compositions, and the process, herein utilize a styrene-butadiene diblock copolymer having a block styrene content that differs from the block styrene content of the styrene-butadiene multiblock thermoplastic elastomer.

In another embodiment, the blends or compositions, and the process, herein utilize a styrene-butadiene multiblock thermoplastic elastomer having a bound styrene content that exceeds the bound styrene content of the styrene-butadiene diblock copolymer.

In another embodiment, the blends or compositions, and the process, herein involve the presence of a styrene-butadiene diblock copolymer in an amount of from about 60% to about 90% and the presence of a styrene-butadiene multiblock thermoplastic elastomer in an amount of from about 10% to about 40%, the amounts based on total polymer.

In another embodiment, the blends or compositions, and the process, herein utilize a styrene-butadiene multiblock thermoplastic elastomer that has a number average molecular weight ($M_n$) which is about equal to the number average molecular weight ($M_n$) of the styrene-butadiene diblock copolymer.

In another embodiment, the blends or compositions, or the process, herein involve the presence of a styrene-butadiene diblock copolymer in an amount ranging from greater than zero to less than 100% based on total polymer, and the presence of a styrene-butadiene multiblock thermoplastic elastomer in an amount ranging from about greater than zero to about 100% based on total polymer.

The process for preparing a styrene-butadiene diblock copolymer-comprising blends or composition that is not an agglomeration, involves the following operations.

A solution of the styrene-butadiene diblock copolymer is prepared, for example, by dissolving the styrene-butadiene diblock copolymer in any suitable solvent. Exemplary of suitable solvents are hexanes, cyclohexane, toluene, mixtures thereof, and the like.

A solution of the styrene-butadiene multiblock thermoplastic elastomer is prepared, for example, by dissolving the elastomer in any suitable solvent. Exemplary of suitable solvents are hexanes, cyclohexane, toluene, mixtures thereof, and the like.

The solutions of the styrene-butadiene diblock copolymer and the styrene-butadiene multiblock thermoplastic elastomer may be prepared separately, or alternatively, a blend of the styrene-butadiene diblock copolymer and the styrene-butadiene multiblock thermoplastic elastomer may be prepared, which blend is then dissolved in solvent.

The solution of the styrene-butadiene diblock copolymer and the solution of the styrene-butadiene multiblock thermoplastic elastomer are mixed at a temperature that causes the mixture to be pumpable.

The mixture of styrene-butadiene diblock copolymer solution and styrene-butadiene multiblock thermoplastic elastomer solution, is mixed to produce a solution (or cement) of the blend.

The resulting solution or cement is then dried to remove solvent to form a dry polymer blend. Any known procedure may be utilized to dry the cement and remove the solvent. For example, suitable drying methods include direct drying, steam desolventizing, and the like.

The dried polymer blends resulting from the process are not agglomerations.

The following examples are presented to illustrate the present disclosure and to assist one of ordinary skill in making and using the same. The examples are not intended in any way to otherwise limit the scope of the disclosure.

EXAMPLES

In determining various properties mentioned herein, the following test procedures were utilized.

Number Average Molecular Weight ($M_n$)—

The number-average molecular weight ($M_n$) and molecular weight distribution of a polymer were measured by gel permeation chromatography (GPC), using a differential refractive index (RI), and, as a solvent, tetrahydrofuran (THF). The molecular weights were expressed in terms of polystyrene, i.e., they were obtained by conversion into polystyrene molecular weight, using monodisperse polystyrene as a standard.

Bound Styrene—

The microstructure of the butadiene moiety of a styrene-butadiene copolymer was determined by the infrared ray method (D. Morero et. Al., Chem. Ind., 41, 758 (1959)). The amount of bound styrene was determined from a calibration curve obtained by the infrared method based on the absorption of a phenyl group at 3026 $cm^{-1}$.

Block Styrene—

The block styrene was determined by the osmium oxidative degradation method as described in I. M. Kolthoff, et al, J. Polym. Sci., 1, 429 (1946). The partial digestion of a styrene-butadiene copolymer (0.5 gram sample) was effected by reaction with osmium tetroxide and t-butyl hydroperoxide. The remaining precipitate (block styrene) was isolated and weighed. The final block styrene was expressed as a weight percent of block styrene by difference from the total polymer amount used.

Example 1

A blend or composition comprising 76% Stereon 210 styrene-butadiene diblock copolymer, and 24% Stereon 842A styrene-butadiene multiblock thermoplastic elastomer was prepared. The Stereon 210 co-polymer has a bound styrene content of 25% and a number average molecular weight ($M_n$) of 68,000 g/mole; and the Stereon 842A elastomer has a bound styrene content of 44.5 weight %, and a ($M_n$) of 67,000 g/mole. The Stereon 210 copolymer, and the Stereon 842A elastomer were each dissolved in hexanes, and both polymer solutions or cements were prepared at 15% total solids.

In preparing the blend, 611 lbs. of the Stereon 210 cement, and 193 lbs. of the Stereon 842A cement were transferred to a blend tank. The contents of the blend tank were mechanically mixed, using an agitator, at a temperature of about 125° to 150° F., for a period of about 2 hours, such that the resultant mixture was pumpable. The hexane was removed from a portion of the total cement by steam desolventization, followed by drying to remove excess water.

As a result of the process, there was obtained about 100 lbs. of the blend, in the form of crumb. Moreover, the resultant crumb was not an agglomeration.

It should be clearly understood that the forms of the invention herein described are illustrative only and are not intended to limit the scope of the invention. The present invention includes all modifications falling within the scope of the following claims.

What is claimed is:

1. A blend comprising a styrene-butadiene diblock copolymer and a styrene-butadiene multiblock thermoplastic elastomer, which blend is not an agglomeration, wherein the bound styrene content of the diblock copolymer differs from the bound styrene content of the elastomer, wherein the number average molecular weight ($M_n$) of the blend ranges from about 40,000 to about 250,000 g/mole, wherein the styrene-butadiene diblock copolymer has a bound styrene content of about 25% based on the copolymer, a block styrene content of about 10% to about 45% based on the copolymer, and a number average molecular weight ($M_n$) of about 68,000 g/mole, wherein the styrene-butadiene multiblock thermoplastic elastomer has a bound styrene content of about 44.5% based on the elastomer, a block styrene content of about 20% to about 60% based on the elastomer, and a number average molecular weight ($M_n$) of about 67,000 g/mole, and wherein the blend is in the form of a crumb and comprises at least 95% styrene-butadiene diblock copolymer and styrene-butadiene multiblock thermoplastic elastomer, the blend not having been produced by a coupling reaction.

2. The blend of claim 1 wherein the styrene-butadiene diblock copolymer is present in an amount of from about 60% to about 90%, and the styrene-butadiene multiblock thermoplastic elastomer is present in an amount of from about 10% to about 40%.

3. The blend of claim 1 not having been produced in situ in a process.

4. A blend comprising a styrene-butadiene diblock copolymer and a styrene-butadiene multiblock thermoplastic elastomer, which blend is not an agglomeration, and wherein the number average molecular weight ($M_n$) of the styrene-butadiene multiblock thermoplastic elastomer is about equal to the number average molecular weight ($M_n$) of the styrene-butadiene diblock copolymer; wherein the styrene-butadiene diblock copolymer has a bound styrene content of about 10% to about 45% based on the copolymer, a block styrene content of about 10% to about 45% based on the copolymer, and a number average molecular weight ($M_n$) of about 40,000 to about 250,000 g/mole and the styrene-butadiene multiblock thermoplastic elastomer has a bound styrene content of about 20% to about 60% based on the elastomer, a block styrene content of about 20% to about 60% based on the elastomer, and a number average molecular weight ($M_n$) of about 40,000 to about 250,000 g/mole, wherein the bound styrene content of the thermoplastic elastomer exceeds the bound styrene content of the diblock copolymer; and wherein the blend is in the form of a crumb and comprises at least 95% styrene-butadiene diblock copolymer and styrene-butadiene multiblock thermoplastic elastomer, the blend not having been produced by a coupling reaction.

5. A blend comprising a styrene-butadiene diblock copolymer and a styrene-butadiene multiblock thermoplastic elastomer, which blend is not an agglomeration, and wherein the number average molecular weight ($M_n$) of the styrene-butadiene multiblock thermoplastic elastomer ranges from about 0.5 to about 2 times the number average molecular weight ($M_n$) of the styrene-butadiene diblock copolymer; wherein the styrene-butadiene diblock copolymer has a bound styrene content of about 10% to about 45% based on the copolymer, a block styrene content of about 10% to about 45% based on the copolymer, and a number average molecular weight ($M_n$) of about 40,000 to about 250,000 g/mole and the styrene-butadiene multiblock thermoplastic elastomer has a bound styrene content of about 20% to about 60% based on the elastomer, a block styrene content of about 20% to about 60% based on the elastomer, and a number average molecular weight ($M_n$) of about 40,000 to about 250,000 g/mole, wherein the bound styrene content of the thermoplastic elastomer exceeds the bound styrene content of the diblock copolymer; and wherein the blend is in the form of a crumb and comprises at least 95% styrene-butadiene diblock copolymer and styrene-butadiene multiblock thermoplastic elastomer, the blend not having been produced by a coupling reaction, wherein the styrene-butadiene diblock copolymer is present in an amount of from about 60% to about 90%, and the styrene-butadiene multiblock thermoplastic elastomer is present in an amount of from about 10% to about 40%.

6. The blend of claim 4 not having been produced in situ in a process.

7. The blend of claim 4 wherein the bound styrene content of the diblock copolymer differs from the bound styrene content of the elastomer by an amount greater than at least about 2%.

8. The blend of claim 4 wherein the bound styrene content of the diblock copolymer differs from the bound styrene content of the elastomer by an amount greater than at least about 10%.

9. The blend of claim 4 wherein the styrene-butadiene diblock copolymer is present in an amount of from about 60% to about 90%, and the styrene-butadiene multiblock thermoplastic elastomer is present in an amount of from about 10% to about 40%.

10. The blend of claim 5 wherein the bound styrene content of the diblock copolymer differs from the bound styrene content of the elastomer by an amount greater than at least about 10%.

* * * * *